(12) United States Patent
Large

(10) Patent No.: US 6,470,526 B2
(45) Date of Patent: Oct. 29, 2002

(54) WHEEL CLEANING DEVICE

(75) Inventor: Charles Fredrick Large, Carlsbad, CA (US)

(73) Assignee: Valvoline Co., division of Ashland Inc., Lexington, KY (US)

( * ) Notice: Subject to any disclaimer, the term of this patent is extended or adjusted under 35 U.S.C. 154(b) by 0 days.

(21) Appl. No.: 09/761,019

(22) Filed: Jan. 16, 2001

(65) Prior Publication Data

US 2002/0092112 A1 Jul. 18, 2002

(51) Int. Cl.⁷ ............................ A47L 13/10; A47L 25/00
(52) U.S. Cl. ..................... 15/244.1; 15/210.1; D32/40
(58) Field of Search ........................... 15/210.1, 244.1, 15/244.2; D32/40, 51, 52; D28/63

(56) References Cited

U.S. PATENT DOCUMENTS

| | | | |
|---|---|---|---|
| 36,600 A | * | 10/1862 | Boeckh |
| 1,100,367 A | * | 6/1914 | Gambill |
| 1,890,894 A | * | 12/1932 | Arnold |
| 2,049,852 A | * | 8/1936 | Mair |
| 2,170,222 A | * | 8/1939 | Strauss |
| 2,732,574 A | * | 1/1956 | Gesell |
| 2,789,305 A | * | 4/1957 | Weil |
| 3,204,277 A | * | 9/1965 | Visman |
| 3,317,944 A | * | 5/1967 | Napier, Sr. |
| 4,075,033 A | | 2/1978 | Knox et al. |
| 4,099,289 A | | 7/1978 | Bretthauer |
| 4,106,154 A | | 8/1978 | Forsberg |
| 4,117,566 A | | 10/1978 | Ward |
| 4,578,837 A | | 4/1986 | Baer |
| 4,856,136 A | | 8/1989 | Janssen |
| 5,067,194 A | | 11/1991 | Rosenfeld et al. |
| 5,077,857 A | | 1/1992 | Sellers |
| D335,223 S | | 5/1993 | Shumway et al. |
| 5,425,589 A | | 6/1995 | Griffin et al. |
| 5,501,399 A | | 3/1996 | Cienkus |
| 5,615,440 A | | 4/1997 | Cowan et al. |
| D384,507 S | * | 10/1997 | Mudie |
| 5,715,559 A | * | 2/1998 | Mitri |
| 5,806,128 A | | 9/1998 | Love |
| 5,862,565 A | | 1/1999 | Lundstedt |
| 6,067,686 A | | 5/2000 | Gronkiewicz |

FOREIGN PATENT DOCUMENTS

| | | | | |
|---|---|---|---|---|
| FR | 390630 | * | 8/1908 | ............ 15/244.1 |
| FR | 1072684 | * | 9/1954 | ............ 15/244.1 |

\* cited by examiner

*Primary Examiner*—Randall E. Chin
(74) *Attorney, Agent, or Firm*—Fulwider Patton Lee & Utecht, LLP

(57) ABSTRACT

A wheel cleaning device formed with an elongated handle and projecting stem. A resilient pad on such stem formed with segments stepped down in transverse cross section toward the distal end of such stem.

24 Claims, 3 Drawing Sheets

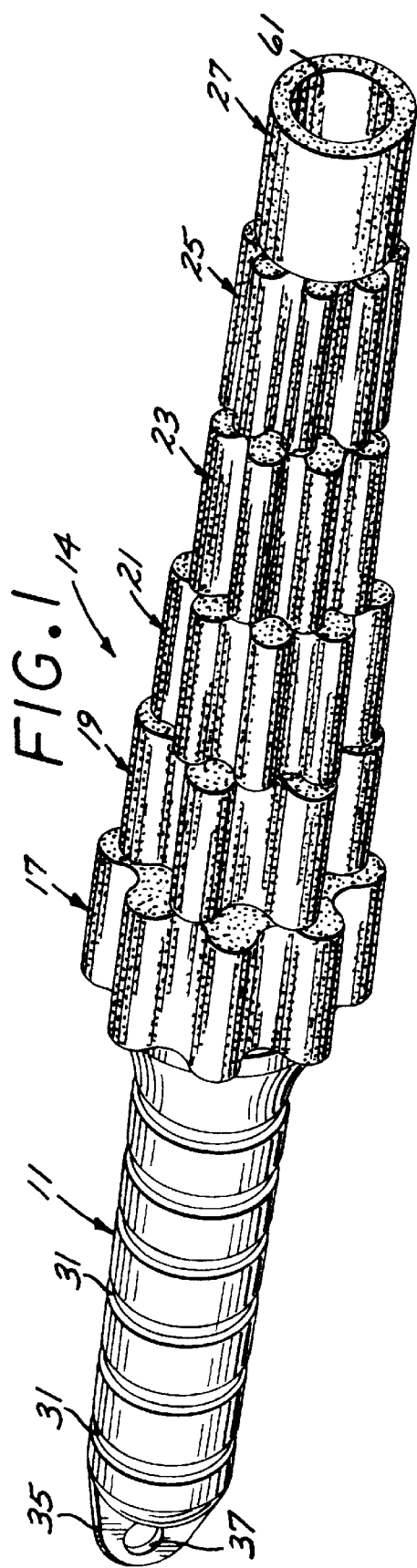
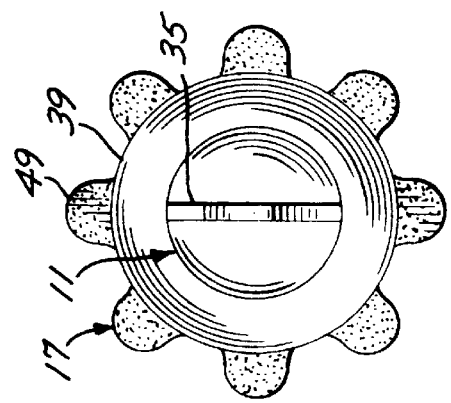
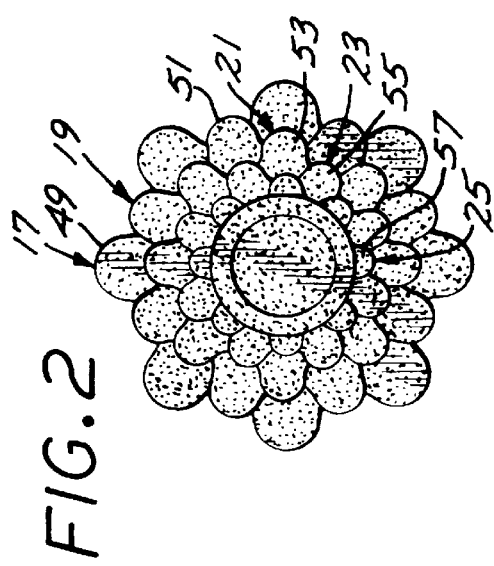

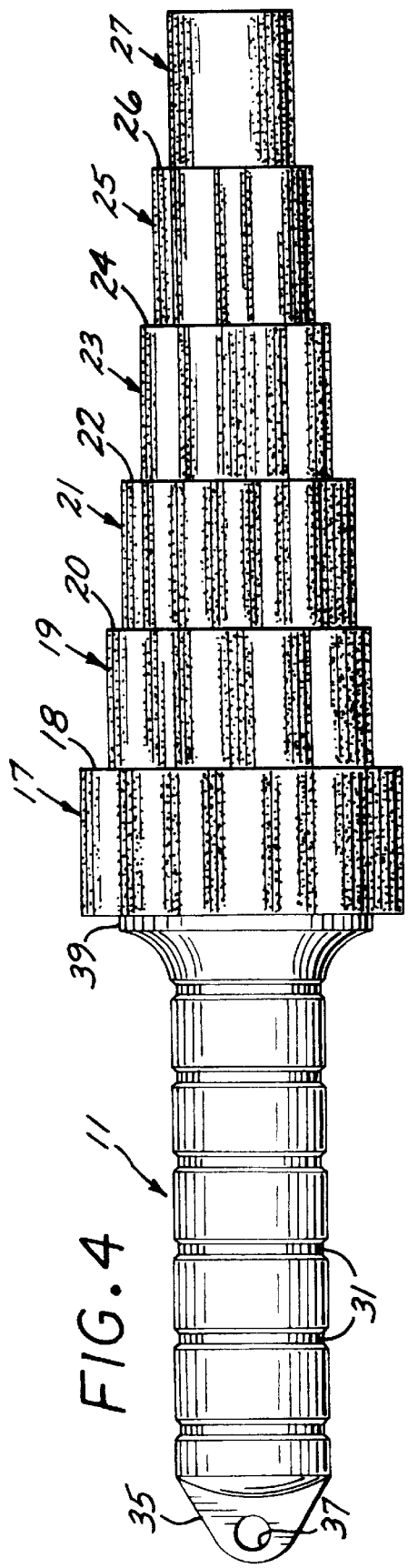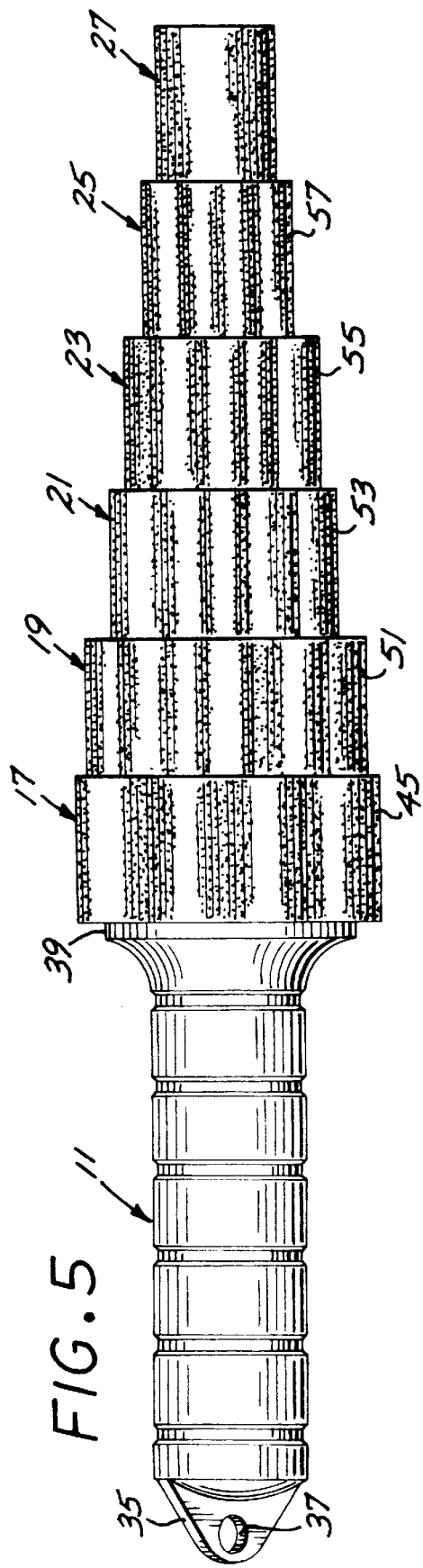

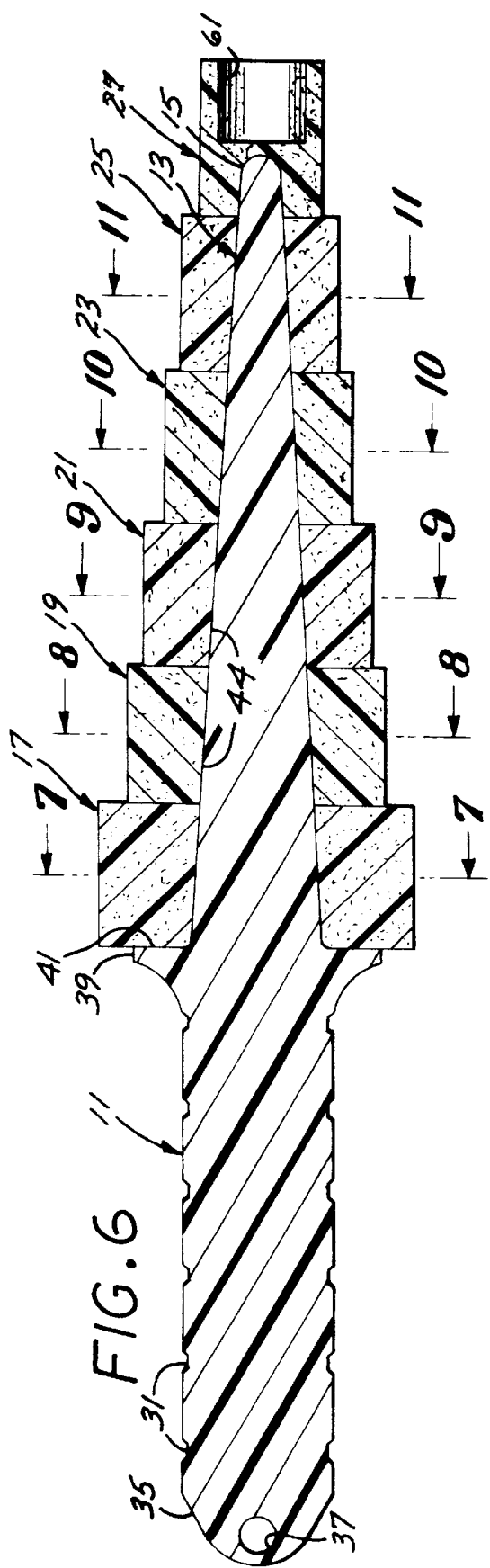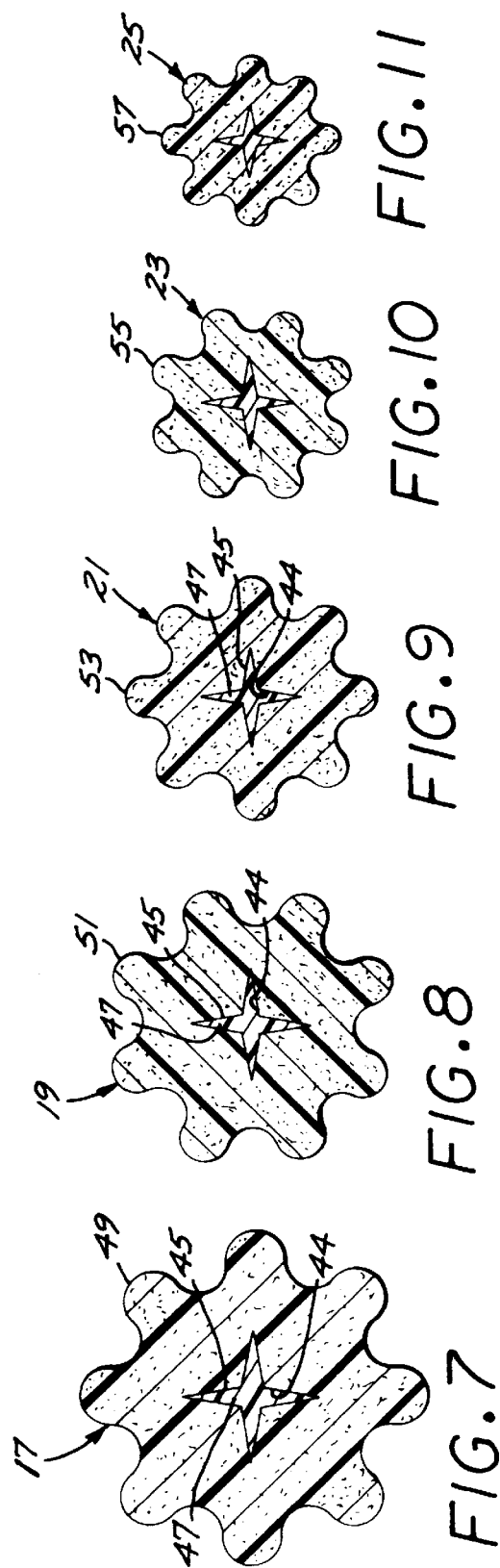

US 6,470,526 B2

WHEEL CLEANING DEVICE

BACKGROUND OF THE INVENTION

1. Field of the Invention

The present invention relates to a cleaning device for cleaning decorative automotive wheels.

2. Description of the Prior Art

Present day automobile wheels are often constructed with attractive designs to generate customer appeal. Customer demand is such that many different styles and configurations of wheels are necessary to meet the diverse taste of customers.

There has developed a very lucrative market for both OEM and aftermarket wheels constructed with numerous different styles of spoke and aperture configurations combined to present an eye pleasing design. Many of these wheels incorporate attractive finishes which may be constructed of expensive metal platings and the like. Such finishes often require a great degree of care in order to maintain a clean attractive appearance. This demands leads to a challenge for the automobile owner in keeping the wheels clean. The challenge is often complicated by fact that the various brake pads rely on liner material for generating frictional resistance to relative movement between the pad and a brake surface wherein the high friction material is subject to slight degradation and generation of dark colored dust and powders during the braking process. This can then leave the wheel and various component parts thereof covered with a dark colored graphite dust or similar powder material which detracts from the appearance of the automobile wheel.

What adds to the challenge of effective wheel cleaning is the fact that popular wheel designs often incorporate recesses, holes, crevices and spaces which have endless numbers of shapes, sizes and angles thus exhibiting a challenge to effective access by presently known cleaning brushes and pads. Commonly used tools, such as oversized sponges, long bristle brushes and sets of brushes with specific sizes and shapes have not provided a satisfactory solution. As an example, in many wheel designs, the depressions and openings therein are formed with radially inwardly turned peripheral lips which often collect dust and grime which is difficult to access with a typical sponge or brush. Those depressions and crevices often incorporate a triangular configuration such that a brush sized for ready access to the enlarged end of the triangle cannot be slid into the narrow end of the triangular crevice thus preventing access to the inturned peripheral lips for adequate cleaning thereof. Also, the effort to utilize a set of multiple brushes of different sizes and shapes is generally impractical. The expense of acquiring such sets of brushes and the challenge of having the properly sized brush readily available at the time it is needed renders the overall proposition quite unsatisfactory.

Many modern day wheel designs often incorporate a recessed lug nut hole pattern wherein the lug nuts are recessed within a generally cylindrically shaped lug nut well such that an annular space of about ⅛ inch is formed between such lug nut and the wall of the well. This often results in restricting access to the wall of the lug nut well thus resulting in dirt, grime and dust being left on the lug nuts and the lug nut well walls thus leaving an unsightly appearance after the cleaning task is completed.

Various different proposals have been made for solving these various problems. As an example, it has been proposed to provide a polishing tool having an elongated stem mounting on one side a series of tufts of brush bristles and on the other side a layer of spongelike material configured in a V-shape for accessing specifically shaped crevices and depressions. A device of this type is shown in U.S. Pat. No. 5,077,857 to Sellers. Such devices, while satisfactory for certain applications, have limited utility and have not been broadly accepted in the marketplace.

In recognition of the need for a device for cleaning lug nut wells, it has been proposed to provide a generally tubular shaped sponge configured to be received telescopically within the lug nut well. A device of this type is shown in U.S. Pat. No. 6,067,686 to Gronkiewicz. This proposed solution is little better than the proposal that sets of differently configured brushes may be provided in that the worker does not find it convenient to turn to a multiple number of tools for achieving the cleaning task.

Consequently, there exists a need for a wheel cleaning tool for accessing wheel indentations and apertures having different shapes, sizes and configurations and which accommodates wide ranges of such configurations. It is preferable if the cleaning task could be undertaken without subjecting the finish of the wheel to harsh rigid surfaces which might result in dragging grit over the finish resulting in scratching thereof.

SUMMARY OF THE INVENTION

The present invention is characterized by a wheel cleaning device having an elongated handle and stem with an elongated foam pad being received on such stem and formed with sections of rings configured with different transverse cross sections for allowing access to different sizes and shapes of crevices and holes within a wheel to be cleaned.

In some embodiments, the stem is cruciform shaped and configured to taper inwardly toward the distal end thereof.

In other configurations, the pad is constructed of discrete foam rings and such rings may be formed with radially projecting flexible ribs which flex under applied forces to enhance accommodation of the contour and size of different shaped crevices.

Other objects and features of the invention will become apparent from consideration of the following description taken in conjunction with the accompanying drawing.

BRIEF DESCRIPTION OF THE DRAWINGS

FIG. 1 is a perspective view of a wheel cleaning tool embodying the present invention:

FIG. 2 is a right hand end view thereof;

FIG. 3 is a left hand end view thereof;

FIG. 4 is a front view thereof;

FIG. 5 is a three-quarter top front view;

FIG. 6 is a longitudinal sectional view of the wheel cleaning tool shown in FIG. 1; and FIGS. 7–11 are transverse cross sectional views, taken along the corresponding respective lines, in FIG. 6.

DESCRIPTION OF THE PREFERRED EMBODIMENT

Referring to FIGS. 1 and 6, the wheel cleaning tool of the present invention includes, generally, a rigid blow molded skeleton constructed with a generally cylindrical handle 11 and a projecting stem 13 which may taper downwardly to a distal tip 15. Received in stacked relationship on such stem are a series of progressively smaller in diameter resilient foam rings 17 through 25 that cooperate in forming a resilient pad, generally designated 14. In one preferred embodiment, as shown in FIG. 1, a lug cleaning ring 27 may be mounted on the distal tip 15.

The skeleton may be constructed of any convenient material but, in the preferred embodiment, is constructed of blow molded plastic with the handle being configured with longitudinally spaced apart, parametrical gripping grooves 31 to facilitate gripping of the handle itself. Such handle is formed on the proximal end with a hanger tab 35 having a bore 37 for hanging from a hook or the like. Such handle is formed at its distal extremity with an outwardly flared flange 39 (FIG. 6).

The flange 39 is formed with a distally facing annular shoulder 41. Projecting distally of such flange 39 is the stem 13. In one preferred embodiment, such stem is formed integral with the handle 11 and is itself in the form of a four pointed star to form radially projecting ribs 45. Such radially projecting ribs 45 have a triangle cross section to be configured with pointed distal extremities 47. The ribs 45 taper radially inwardly in the distal direction to the reduced cross section distal tip 15 of the stem 13.

The pad 14, formed by the respective rings 17–25, is progressively reduced in cross section toward the distal extremity. Such pad may be formed with the rings 17–25 integral with one another to define a one-piece construction or, as depicted in the preferred embodiment, such rings may be discrete sections. The rings themselves may be constructed of any desirable resilient material which will readily compress radially inwardly under diametrically inwardly directed forces so as to facilitate accommodation of the various cross sections, curvatures and crevices in openings and depressions in an automobile wheel. It is also contemplated that the rings may be elongated and cylindrical in peripheral profile defining a plurality of discrete cylinders that progress from the proximal to the distal tip 15 of the stem 13 in stepped down diametrical reductions such that the distal end of each ring is formed with a distally facing ring surface adjacent to the stepped down periphery of the ring that follows it in sequence.

In the preferred embodiment, the rings 17–25 are constructed of an open pore, polyurethane foam. The respective rings 17–25 are die cut to form corrugated peripheries so as to define respective radially outwardly projecting longitudinally extending ribs 49–57 (FIGS. 7–11), with their respective radially outer extremities being rounded to terminate in respective longitudinal axially projecting crowns.

In practice, the ring 17 has a major diameter of about 2-½ inches with each ring 19–25 being reduced about ¼ of an inch in diameter from the preceding ring. Such rings are so configured and shaped so as to facilitate receipt into the various openings in an automobile wheel and are then depressible radially inwardly to a degree sufficient to cause the resilient foam itself to assume the contour of the wheel opening for rubbing against the edges of such opening or the lips or flanges forming the various openings. Also, by configuring the rings 17, 19, 21, 23 and 25 with the step diameter construction as shown in FIG. 4, each proximal ring is formed with distally facing diametrical end surfaces which will be engaged in washing contact with the axially outwardly facing marginal surfaces of holes in wheels being washed by the immediately distal ring.

It will be noted that in the preferred embodiment, as one progresses from ring to ring along the sequence from ring 17 to 25, each ring is rotated about 10° relative to the previous ring so that the respective ribs 51 of the ring 19 are registered in longitudinal alignment with the grooves formed between the respective ribs 49 of the ring 17 and so on as one progresses distally along the stem 13.

In one preferred embodiment, the ring 27 mounted on the distal tip 15 is also constructed of resilient material, such as foam, and is of a generally annular shape being formed at its distal extremity with a distally outwardly opening cylindrical socket 61. The ring 27 is about one inch in diameter and the socket 61 about ¾ of an inch in diameter so that such ring 27 will form an interference fit with sockets about ⅞ of an inch in diameter formed in automotive wheels for depression therein of lug nuts. The socket 61 is constructed to be slip fit over such lug nuts such that fitting the ring 27 into the respective sockets and rotating the tool will tend to clean the sockets and also clean the wall of the respective lug nuts.

In use, it will be appreciated that the tool of the present invention may be conveniently stored, such as by hanging from a hook on the wall of a garage, or may be stored in the user's car. When the user washes the car and wants to address the issue of cleaning his or her automobile wheels, the tool may be grasped by the handle 11 and the wheel sprayed with water and, if desirable, the pad 14 sprayed with water throughout. The distal end of the pad 14 may be inserted in the various openings, depressions and crevices in the wheel and for the smaller cross section openings the smallest diameter ring 25 will suffice for registering therewith. By pressing laterally on the handle 17 toward the smaller portions of any such irregularly shaped openings, the radially outwardly extremities of the laterally projecting ribs 57 may be deflected radially inwardly with one or more of the ribs directed toward the smallest contours in such openings, serving to rub the respective walls of such opening to remove dirt and grit. It will be appreciated that, by orienting the handle such that the distal extremity 47 of a selected one of the flanges 45 of the stem 13 is directed to the narrowest extremity of such wheel opening, that flange will serve to facilitate in pressing the juxtaposed portion of, for instance, the ring 25 which is disposed to the greatest extent toward such narrow portion, against the wall thereof to further facilitate contact with the edges of such opening. It will be appreciated that the tool can be manipulated with one hand and the other hand will be free to manipulate a hose, nozzle or the like to maintain a stream of water on the pad 14 so as to provide for the greatest degree of moisture and lubricity stemming from robust water flow.

It will be appreciated by those skilled in the art that, for slightly larger contours and crevices in wheel openings, the tool may be inserted axially inwardly a slightly greater distance to register the second smallest ring 23 therewith to utilize the respective rib 55 of that ring to access the narrow crevices and contours thereof. It will be appreciated that at the transition plane between the ring 25 and 23, the respective rib 55 of the proximal ring will project radially outwardly a distance greater than that for the rib 57 of the more distal ring 25. Thus, at the transition plane, there is a somewhat triangular relationship formed between the cross section outline of two adjacent ribs 57 of the ring 25 and the rib 55 aligned intermediate those ribs 57 such that the three ribs themselves will cooperate in gaining the most efficient and effective access to a narrow crevice in an opening or compound contours in the respective wheel openings.

It will be appreciated that for various wheel openings having slightly larger crevices and contours to be cleaned, the various ones of the other rings 21, 19, or 17 may be registered with those areas in the openings to facilitate cleaning thereof.

As the task of cleaning the wheel is completed, it will be appreciated that the tool may be withdrawn from the respective openings in the wheels and the lug cleaning ring 27 may be registered over a selected one of the wheel lugs and, assuming the lug is depressed axially inwardly within a lug nut well formed in the wheel, the exterior wall of such ring will engage the wall of the well so that axial shifting of such ring in the well or rotation of the tool to rotate such ring within the well will serve to apply a light mechanical force to any dirt, grit or grime in the well to effect cleaning thereof. Also, by constructing the lug nut cleaning ring 27 with the socket 61 thereof with a sufficiently small diameter to form a friction fit with the lug nuts to be cleaned, such ring will serve to clean the lug nut during axial shifting relative thereto and during rotation thereon. Finally, by forming the depth of the socket 61 such that the axially inner wall of such socket bottoms out on the axially outer end of the lug nut, such axially outer end will be cleaned by rotation of such ring 27 relative to the lug nut itself.

In practice, the ribs 45 of the stem 13 are formed with distally sloped locking teeth disposed in spaced relationship therealong for registration with the respective rings 17–27 to facilitate assembly thereof. The apertures 44 are conveniently constructed with a cross section smaller than the cross section formed by the respective flanges 45 of the stem 13 to thus form an interference fit. Thus, during assembly, when the respective rings are telescoped over the stem 13 from the distal end thereof and brought into registration in their respective positions along such stem, the distally facing teeth will engage such respective rings to lock them in their respective positions on such stem. In some instances, the distal most ring 27 is also bonded to the stem.

From the foregoing, it will be appreciated that the cleaning tool of the present invention provides a convenient and practical way of cleaning holes and indentations formed in the face of automobile wheels. The device is sturdy, compact, convenient to use and produces a uniform result.

Various modifications and changes may be made with regard to the foregoing detailed description without departing from the spirit of the invention.

What is claimed is:

1. A wheel cleaning device comprising:
   an elongated handle having an elongated cruciform in cross section stem projecting from one end thereof to terminate in a distal end; and
   an elongated contoured foam pad telescoped over said stem and including a plurality of stacked foam rings progressively increasing in diameter from said distal end toward said handle whereby a user may grasp said handle and insert said stem into an opening in a wheel to the extent where the diameter of one of said rings complements the cross section of said opening.

2. A wheel cleaning device as set forth in claim 1 wherein: said pad is formed with said rings configured with respective radially projecting ribs.

3. A wheel cleaning device as set forth in claim 1 wherein: said handle is constructed of blow molded plastic.

4. A wheel cleaning device as set forth in claim 1 wherein: said pad is constructed with said rings configured in discrete segments.

5. A wheel cleaning device as set forth in claim 1 wherein: said pad is formed with five said rings.

6. A wheel cleaning device as set forth in claim 1 wherein: said pad includes at its distal end a tubular foam lug nut cleaning ring.

7. A wheel cleaning device as set forth in claim 6 wherein: said lug nut cleaning ring is formed with a cylindrical interior socket.

8. A wheel cleaning device as set forth in claim 6 wherein: said lug nut cleaning ring is formed with an annular peripheral wall.

9. A wheel cleaning device as set forth in claim 1 that includes:
   a mechanical lock formed between said stem and pad.

10. A wheel cleaning device as set forth in claim 1 wherein:
    said pad is formed with said rings defining discrete sections, each having uniform transverse cross sections throughout their respective lengths.

11. A wheel cleaning device as set forth in claim 1 wherein:
    said rings are configured with a plurality of radially projecting, longitudinally elongated ribs spaced about the respective peripheries thereof.

12. A wheel cleaning device as set forth in claim 1 wherein:
    said pad is formed with said rings having generally corrugated peripheries to define eight equi-spaced radially projecting ribs.

13. A wheel cleaning device as set forth in claim 12 wherein:
    said pad is formed of die cut foam.

14. A wheel cleaning device as set forth in claim 1 wherein:
    said pad is configured with closed cell foam.

15. A wheel cleaning device as set forth in claim 1 wherein:
    said pad is formed of die cut foam.

16. A wheel cleaning device as set forth in claim 1 wherein:
    said pad is formed with said rings configured in discrete sections; and
    said device includes a mechanical lock formed between the respective individual rings and said stem.

17. A wheel cleaning device comprising:
    an elongated handle having an elongated cruciform in cross-section stem projecting from one end thereof to terminate in a distal end;
    an elongated contoured foam pad telescoped over said stem and including a plurality of stacked foam rings progressively increasing in diameter from said distal end toward said handle whereby a user may grasp said handle and insert said stem into an opening in a wheel to the extent where the diameter of one of said rings complements the cross section of said opening; and
    said stem being configured with four equally spaced ribs having free edges which taper distally and inwardly toward one another from said handle.

18. A wheel cleaning device comprising:
    an elongated contoured cleaning pad configured with a relatively large cross sectional proximal portion and being formed with reduce in transverse cross section segments toward the distal end thereof for being progressively received in holes formed in a wheel to be cleaned; and
    an elongated skeleton including an elongated handle having a cruciform in cross section stem projecting from the distal end thereof and penetrated longitudinally into said pad from a proximate end of said pad that defines the beginning of its proximal portion for supporting said pad for cleaning of said wheel.

19. A wheel cleaning device as set forth in claim 18 wherein:

said pad is constructed of a plurality of cylindrically shaped discrete rings configured to form downwardly stepped diameters progressing towards the distal end of said stem.

20. A wheel cleaning device comprising:

an elongated contoured cleaning pad configured with a relatively large cross sectional proximal portion and being formed with reduced in transverse cross section segments toward the distal end thereof for being progressively received in holes formed in a wheel to be cleaned; and an elongated skeleton including an elongated handle having a cruciform in cross section stem projecting from the distal end thereof and penetrated longitudinally into said pad from the a proximate end of said pad for supporting said pad for cleaning of said holes in said wheel.

21. A wheel cleaning device comprising:

an elongated handle formed at one end with an elongated stem projecting therefrom; and a plurality of elongated cylindrically shaped stacked foam rings formed with radially outwardly projecting longitudinally extending ribs cooperating to form elongated distal crowns disposed on the circumference of a circle to selectively be engaged with the perimeter of openings in a wheel to flex and cooperate togther in accommodating the contour of such openings;

said rings being configured with said ribs cooperating to form longitudinal grooves and adjacent rings are rotated relative to one another such that the ribs of immediately adjacent rings register longitudinally with the grooves of the preceding ring.

22. A wheel cleaning device comprising:

an elongated handle formed at one end with a longitudinally projecting stem; and at least four cylindrically shaped elongated foam pad rings mounted on said stem and configured with a proximal ring having a maximum diameter of substantially 2-½ inches with the diameters of each ring progressing distally having diameters of substantially 2-¼, 2 and 1-¾ inches.

23. The wheel cleaning device of claim 22 wherein:

said rings are formed with longitudinal ribs spaced equidistance thereabout and formed therebetween with longitudinally projecting grooves.

24. A wheel cleaning device comprising:

an elongated handle formed at one end with an elongated cruciform in cross section stem projecting therefrom; and a plurality of elongated cylindrically shaped stacked foam rings formed with radially outwardly projecting longitudinally extending ribs cooperating to form elongated distal crowns disposed on the circumference of a circle to selectively be engaged with the perimeter of openings in a wheel to flex and cooperate together in accommodating the contour of such openings.

* * * * *